Dec. 5, 1939. A. K. FOULDS Re. 21,286

CONTROL MEANS

Original Filed May 9, 1932

Andrew K. Foulds INVENTOR-

BY C. B. Heylmun his ATTORNEY-

Reissued Dec. 5, 1939

Re. 21,286

UNITED STATES PATENT OFFICE 21,286

CONTROL MEANS

Andrew Kip Foulds, Grosse Pointe Park, Mich., assignor to Detroit Lubricator Company, Detroit, Mich., a corporation of Michigan Original No. 2,067,836, dated January 12, 1937, Serial No. 610,064, May 9, 1932. Application for reissue January 9, 1939, Serial No. 249,979

29 Claims. (Cl. 137—68)

My invention relates to new and useful improvements in control means, and more particularly to means for controlling the flow of liquid.

An object of my invention is to provide means to maintain a substantially constant desired level of supplied liquid at a point of delivery.

Another object is to provide means to stop the delivery of liquid upon increase in the liquid level above the desired constant level.

Another object is to provide an actuating means movable in response to variation of liquid level and operable on movement to actuate directly a normal controlling means and also operable on movement to actuate a normally ineffective safety means for actuating said controlling means.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1:
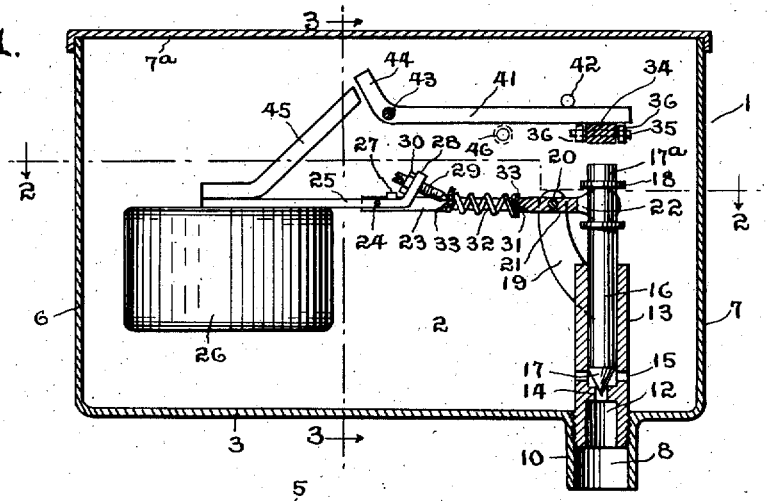
Figure 1 is a view in vertical section of a device embodying my invention.
Figure 2:
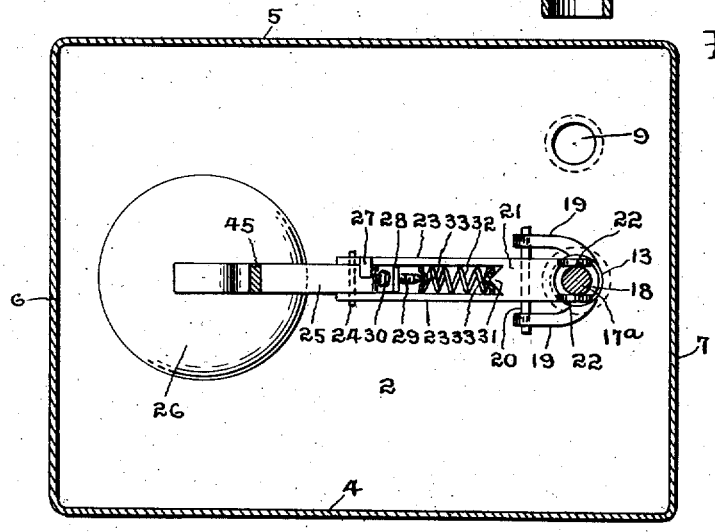
Fig. 2 is a view in horizontal section on the line 2—2 of Fig. 1.
Figure 3:
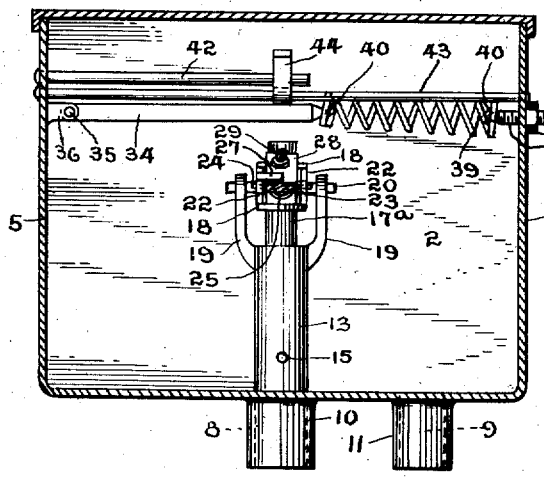
Fig. 3 is a view in vertical section on the line 3—3 of Fig. 1.

Referring to the drawing by characters of reference, 1 designates, generally, a hollow casing or container enclosing or having a chamber or reservoir 2 having a bottom wall 3 from which rise side walls 4, 5 and end walls 6, 7. The casing may be provided with a closure member or cover 7a defining the top wall of the chamber and which fits loosely or has an air bleed opening so that liquid can flow freely into and from the chamber through passageways hereinafter described. The chamber has a plurality of liquid flow ports including an inlet 8 and an outlet 9 which preferably open through the bottom wall 3 adjacent the end wall 7. The inlet and the outlet may be connected respectively to a source of liquid supply and to a point of delivery by conduits connected to the inlet and outlet nipples 10, 11 respectively, which depend from the underface of the bottom wall 3. The inlet 8 opens into the bore 12 of a sleeve or tubular member 13 which rises vertically from the bottom wall 3. The member 13 may be screw-threaded or otherwise rigidly secured and sealed in the inlet 8 and has adjacent the plane of the bottom wall an internal annular flange or shoulder 14 defining an upward facing valve seat and a valve port. Above the flange 14 the member 13 is provided with one or more ports 15 through the side wall thereof opening from the bore 12 into chamber 2. Within the bore 12 is a means controlling the inlet, such as a valve member 16, which is vertically reciprocable and guided in its reciprocation by the walls of member 13. The member 16 preferably has a conical valvehead 17 which cooperates with and seats upon the flange 14 to close the inlet. The reciprocable valve operating member or stem 17a of the valve member extends above the sleeve member 13 and is provided at its projecting end with vertically spaced collars of circumferential flanges 18 for a purpose to be described.

Projecting upward from the sides of and rigid with the sleeve member 13, are a pair of spaced supporting arms 19 which extend toward the end wall 6 and which are joined at their upper free ends by a substantially horizontal bearing or pivot pin 20. A lever or operating member 21 extends between the arms 19 and is journaled or fulcrumed on the pin 20, one end of the member terminating in a yoke having its arms 22 positioned on opposite sides of the valve stem and between the collars 18. The other end of the lever is formed by laterally spaced, substantially parallel arms 23 which are joined adjacent their free ends by a bearing or pivot pin 24. Supported on the pin 24 is a lever arm 25 which lies in the plane of arms 23 and extends outward therefrom toward wall 6. The outer end of arm 25 supports a float member or actuating means 26 which is rigidly secured thereto and depends therefrom. A stop 27 rigid on the lever 21 overlies the arm 25 on the opposite side of its fulcrum 24 from the float and holds the lever and arm rigid against relative movement under the force of gravity acting on the float. The inner end 28 of the lever arm extends upward and is inclined toward the valve to provide a support. Carried by the upturned end 28 is an adjustable abutment 29, such as a screw or the like, having a conical or pointed end which is screw-threaded through the arm end and has a lock nut 30. The lever 21 is provided between the arms 23 with a pointed abutment 31 directed toward the abutment 29, and between the abutments is positioned a compression spring 32 having end follower plates 33 seating against the abutments. The spring 32 is preferably of the helical coil type and engages the abutment 29 above the line of centers of pins 20 and 24, so that a component of the force of the spring resists clockwise movement of the float about pin 24 and urges arm 25 against stop 27 so that in normal operation any movement of arm 25 will result in like movement of lever 21.

A normally ineffective or inactive safety means is provided, including a lever or operating member 34 which overlies the valve stem and is pivotally supported at one end on a pin 35 extending between horizontally spaced ears 36 carried by and rigid with the side wall 5. At a point opposite the ears 36 there is an adjustable abutment 37 supported by the side wall 4. The abutment 37 is preferably a screw or the like screw-threaded through the wall 4 and provided with a lock nut 38. Positioned between the free end of the lever 34 and the abutment 37 is a spring 39 preferably of the helical coil type held under compression therebetween and having spring follower members 40 seating against the conical ends of the lever 34 and the abutment screw. The point of engagement between the spring and the lever 34 is slightly above or overcenter, so that the spring normally acts to urge the lever upward to hold the lever normally ineffective or in inactive position. Upward movement of the lever is limited by a trip lever or bar 41 which extends transversely over the lever 34 and engages a superposed stop pin or rod 42 rigidly supported by the side wall 5. The trip lever 41 extends substantially horizontally toward the float or end wall 6 and is pivotally supported intermediate its ends on a shaft 43, which may be fixed at its ends in the side walls 4, 5. The free end 44 of the trip lever is preferably inclined upward toward the end wall 6 to provide a contact surface. Rigidly secured on the float is an operating arm 45 which is inclined upwardly substantially at right angles to the lever end 44 and which terminates substantially in contact therewith when the float is in its normal raised position which will seat the valve.

The operation of my control means is as follows: As liquid enters the inlet 8 and rises in chamber 2, the float 26 will rise with the liquid and move the valve member 16 toward inlet closing position. The spring 32 will hold the lever operating member comprising arm 25 and lever 21 rigid relative to each other for all normal changes of level in the chamber 2. When the level of liquid in chamber 2 and therefore at the point of delivery connected to outlet 9 reaches the predetermined desired constant level, the float will be in its normal maximum raised position, and due to the resistance of spring 32 will act through lever arms 25 and 21 to urge the valve member to its seat to cut off flow into the chamber 2. If for any reason the valve should fail to close the inlet when the liquid level in chamber 2 reached its desired normal maximum level, then the safety means will be actuated by overtravel of the float to seat the valve and stop admission of liquid to the chamber. Under such a condition, the level of liquid would rise in chamber 2, immersing the float to an increasing depth, as the float could not rise with the liquid due to the resisting component of force of the spring 32. As the level of liquid around the float is increased, the buoyant force of the float will increase against the resistance of spring 32. When the increased buoyant force of the float exceeds the resistance of spring 32, the float will overcome the spring 32 and move upward quickly, turning about its fulcrum 24. It may be noted that the resistance of spring 32 is preferably only sufficient to hold the arm and lever rigid in normal operation, so that a very small increase in liquid level above normal will act through the float to overcome the spring 32. It may also be noted that the resistance of spring 32 may be adjusted by the abutment screw 29, both as to its inherent resistance and as to the height of its point of engagement with arm 25 above center. The quick upward movement of float 26 upon overcoming spring 32 will raise the position of the float in the liquid thereby quickly lowering the level of the liquid in the reservoir. As the float 26 turns about pin 24, the arm 45 will engage the end 44 of trip lever 41 and rotate it clockwise of Fig. 1 about shaft 43. Lever 41 is resting on the operating lever 34, and it will therefore move lever 34 downward against the resistance of spring 39, the point of engagement between spring 39 and lever 34 being only sufficiently above center to hold the lever 34 in inactive up position. As the lever 34 is moved down through center, the force of spring 39 will push the lever quickly downward to impact sharply against the top of the valve stem 17 and drive the valve member to its seat, thus cutting off the inlet 8. The limited downward or clockwise movement of the lever 41 prevents the arm 25 from moving so far as to permit spring 32 to snap out of position between abutments 29 and 31, although I preferably provide a stop 46 similar to stop 42 and supported by the wall 5 to limit downward movement of lever 41 and thus insure that the movement of abutment 29 will not be such as to permit spring 32 to snap out of position.

It will thus be seen that I have provided a safety means operable by increased liquid level in the float chamber to cut off flow to and through the chamber on failure of the control valve to function to cut off the flow.

What I claim and desire to secure by Letters Patent of the United States is:

1. A device of the character described, comprising a hollow casing having an inlet and an outlet, a valve controlling said inlet, safety means normally inactive and operable to move said valve to close said inlet, and a float member within said casing and responsive directly to liquid level in said casing to regulate opening and closing of said valve to maintain a substantially constant liquid level in said casing, said float member having provision for overtravel and acting upon increase of liquid level above said constant level to actuate said safety means.

2. A device of the character described, comprising a hollow casing having an inlet and an outlet, a single valve means controlling said inlet, a float member operable to open and close said valve means to maintain a substantially constant liquid level in said casing, and means in said casing operable by said float member upon increase of liquid level in said casing above said constant level to move said valve means to close said inlet.

3. A device of the character described, comprising a hollow casing having an inlet and an outlet, a single valve means in said casing controlling said inlet, a float member in said casing operable to open and close said valve means to maintain a substantially constant liquid level in said casing, safety means housed within said casing and operable to move said valve means to close said inlet, and means in said casing operable by said float member upon increase of liquid level in said casing above said constant level to actuate said safety means whereby to close said inlet.

4. A device of the character described, comprising a hollow casing having an inlet and an outlet, a single valve means controlling said inlet, a float in said casing cooperable with said valve means and normally actuating said valve means to maintain a substantially constant liquid level in said casing, spring means under stress and operable to exert its force to move said valve means to close said inlet, and means operable by said float upon failure of said valve means to close said inlet to release the force of said spring means.

5. A device of the character described, comprising a hollow casing having an inlet and an outlet, a float responsive to liquid level in said casing, a single valve means controlling said inlet and operable by said float, said valve means acting to close said inlet upon movement of said float in response to predetermined liquid level in said casing, and safety means operable to move said valve means to close said inlet, said safety means being actuated by said float upon increase in liquid level in said casing above said predetermined level.

6. A device of the character described, comprising a hollow casing having an inlet and an outlet, a single valve means controlling said inlet, overcenter means operable on movement overcenter to engage and move said valve means to close said inlet, and a float responsive to liquid level in said casing and cooperable with said valve means to maintain a substantially constant liquid level in said casing, said float being operable upon increase of liquid level in said casing above said constant level to move said last-named means overcenter.

7. A device of the character described, comprising a hollow casing having an inlet and an outlet, valve means controlling said inlet, a lever operatively engaging said valve means, a float pivoted on said lever and controlling said valve means, means resisting movement of said float relative to said lever, safety means cooperable with said float and operable to move said valve means to close said inlet, said float acting upon failure of said valve means to close said inlet to overcome said resisting means and actuate said safety means.

8. A device of the character described, comprising a hollow casing having an inlet and an outlet, valve means controlling said inlet, a lever operatively engaging said valve means, a lever arm pivoted on said lever, a float carried by said arm, a stop opposing movement of said arm relative to said lever by gravity acting on said float, means resisting movement of said arm relative to said lever by the buoyant force of said float, and safety means operable by said float to move said valve means to close said inlet, said float acting upon increased liquid level above the predetermined desired normal level to overcome said resisting means and actuate said safety means.

9. A device of the character described, comprising a hollow casing having an inlet and an outlet, a valve controlling said inlet, a float in said casing cooperable with said valve and normally acting to maintain a substantially constant liquid level in said casing, means operable on said valve to move said valve to close said inlet, spring means under stress and acting on said last-named means, and means operable by said float upon failure of said valve to close said inlet to release the force of said spring means.

10. A device of the character described, comprising a hollow casing having an inlet and an outlet, a valve controlling said inlet, a float in said casing cooperable with said valve and normally acting to maintain a substantially constant liquid level in said casing, a lever cooperable with said valve to move said valve to close said inlet, spring means under stress and acting on said lever, and means operable by said float upon failure of said valve to close said inlet to release the force of said spring means.

11. A device of the character described, comprising a hollow casing having an inlet and an outlet, a valve controlling said inlet, a float in said casing cooperable with said valve and normally acting to maintain a substantially constant liquid level in said casing, means operable on said valve to move said valve to close said inlet, spring means under stress and acting on said last-named means, and a lever operable by said float upon failure of said valve to close said inlet to release the force of said spring means.

12. A device of the character described, comprising a hollow casing having an inlet and an outlet, a valve controlling said inlet, a float in said casing cooperable with said valve and normally acting to maintain a substantially constant liquid level in said casing, overcenter means operable on movement overcenter to move said valve to close said inlet, and a lever cooperable with said float and operable to move said last-named means overcenter, said float acting on increase of liquid level above said constant level to move said lever.

13. A device of the character described, comprising a hollow casing having an inlet and an outlet, a valve controlling said inlet, a float in said casing cooperable with said valve and normally acting to maintain a substantially constant liquid level in said casing, overcenter means operable on movement overcenter to move said valve to close said inlet, said overcenter means including spring means held under stress, and a lever cooperable with said float and operable to move said last-named means overcenter whereby said spring means can act to close said valve, said float acting on increase of liquid level above said constant level to move said lever.

14. A device of the character described, comprising a hollow casing having an inlet and an outlet, a single valve member controlling said inlet, a float in said casing operatively connected to said valve member and normally actuating said valve member to maintain a substantially constant liquid level in said casing, said float having provision for overtravel upon increase of liquid level above said constant level, safety means controlling said inlet through actuating said valve, and means operable by said float upon overtravel thereof to actuate said safety means.

15. A device of the character described, comprising a hollow casing having an inlet and an outlet, valve means controlling said inlet, a lever operatively engaging said valve means, an arm pivoted on said lever, means normally acting to hold said arm and lever against relative movement, a float carried by said arm and acting through said lever to maintain a substantially constant liquid level in said casing, and safety means operable to close said valve means upon relative movement between said arm and said lever, said float acting upon increased liquid level in said casing above the predetermined desired normal level to overcome said holding means whereby to move said arm relative to said lever.

16. A device of the character described, comprising a hollow casing having an inlet and an outlet, a valve controlling said inlet, a float in said casing cooperable with said valve and normally acting to maintain a substantially constant liquid level in said casing, a lever having a fulcrum support and operable to move said valve to close said inlet, means to force said lever against said valve, and means operable by said float to actuate said last-named means upon failure of said valve to close said inlet.

17. A control device, comprising a hollow casing, means in said casing responsive to variation of liquid level therein, a lever having relatively movable arms pivoted together and pivotally supporting said responsive means, means acting to normally hold said arms against relative movement, said responsive means having provision for overtravel upon relative movement between said arms, means to limit the movement of one of said arms upon the occurrence of predetermined liquid level in said casing, said responsive means acting upon increase of liquid level above said predetermined level to overcome said holding means, and control means operable by said responsive means upon said responsive means overcoming said holding means.

18. In a liquid level control device, a hollow casing having an inlet port and an outlet port, a valve in said casing for controlling said inlet port, a float in said casing for actuating said valve in response to changes in liquid level to maintain a substantially constant liquid level in said casing, a lever connecting said valve and said float and fulcrumed within said casing, said lever having two arms pivoted together and movable relative to each other with the float connected to one of said arms and the valve to the other, resilient means normally preventing relative movement between said lever arms, a stop member to limit movement of one of said arms relative to the other in one direction, said float acting upon a predetermined rise of liquid level in said casing above said constant level to overcome the force of said resilient means to move one of said arms relative to the other whereby said float can move beyond its normal range of operation, safety cut-off means operable by said float to close said inlet port upon predetermined movement of said float relative to said valve, and means for transmitting movement of the float to said safety cut-off means, said transmitting means being disposed outside of the normal range of movement of said float and out of normal engagement therewith.

19. A device of the character described comprising a hollow casing having an inlet and an outlet, valve means controlling said inlet, overcenter means operable on movement overcenter to engage and move said valve means to close said inlet, said overcenter means being normally out of operative engagement with said valve means, and a single float operable in response to changes in liquid level in said casing to actuate said valve means to maintain a substantially constant liquid level therein and also operable in response to a predetermined increase in liquid level above said constant level for moving said last-named means overcenter.

20. In a device of the character described, a hollow casing defining a constant level chamber having an inlet and an outlet, a valve member controlling said inlet, a float member operatively connected to said valve member and acting to move said valve member to close said inlet upon predetermined liquid level in said chamber, yieldable means operatively connecting said float member and said valve member, said float member being immersed above its normal floating level upon failure of said valve member to close said inlet and being released by said yieldable means upon predetermined immersion above said normal floating level, and means in said chamber actuated to close said inlet valve member upon such release of said float member.

21. In a liquid level control device, a hollow casing defining a constant level chamber having an inlet and an outlet, valve means controlling said inlet, a single means responsive to liquid level in said chamber, said responsive means moving to one position upon occurrence of predetermined desired constant liquid level in said chamber, means cooperable with said valve means and engaged by said responsive means to move said valve means to closed position upon movement of said responsive means to said one position, said responsive means being movable to a second position upon increase of liquid level above said predetermined level, and means cooperable with said valve means and engageable by said responsive means upon movement of said responsive means to said second position to move said valve means to closed position.

22. A liquid level controlling device, comprising a casing having a liquid receiving chamber with an inlet thereto, valve means controlling said inlet, a float in said chamber, a plurality of levers connecting said float to said valve means and operable to transmit movement from said float to said valve means to maintain a constant liquid level in said chamber, said levers being movable relative to each other upon predetermined increase of liquid level in said chamber above said constant level, and means operable upon such relative movement of said levers to actuate said valve means to close said inlet.

23. A liquid level controlling device, comprising a casing having a liquid receiving chamber with an inlet thereto, valve means serving both as the normal and also as a safety flow controlling means for said inlet, a float member in said chamber operable both as the normal constant level responsive means and also as an excess liquid level safety responsive means, a plurality of levers operatively connecting said float member to said valve means, one of said levers being secured to said float member, another of said levers transmitting float member movement from said one lever to said valve means to maintain a constant liquid level in said chamber, said levers being movable relative to each other upon movement of said float member in response to excess liquid level, and means operable upon said valve means to move said valve means to close said inlet when said float member responds to excess liquid level.

24. In a liquid level controlling device, a reciprocable controlling member, a responsive member movable by change of liquid level and operable on movement in one direction to move said controlling member, and normally ineffective safety means operable on movement to move said controlling member, said responsive member acting upon continued movement in said one direction to move said safety means.

25. In a liquid level controlling device, valve means operable to control liquid flow, an operating member, a normally ineffective safety means, a reciprocable member operable to actuate said valve means and operable by said operating member and by said safety means, and a single member movable by variation of liquid level and operable to move said operating member and said safety means.

26. A liquid level controlling device comprising a container having an inlet and an outlet, valve means operable to control flow through said inlet into said container, actuating means operable upon occurrence of a predetermined liquid level in said container to move said valve means to close said inlet, and normally ineffective safety means operable to move said valve means to close said inlet and operable by said actuating means.

27. A liquid level controlling device comprising a container having an inlet and an outlet, valve means having a stem and operable to control flow through said inlet, a plurality of operating members for actuating said stem, and an actuating member cooperable with one of said operating members upon occurrence of a predetermined liquid level in said container to move said stem, said actuating member being cooperable with another of said operating members to move said stem upon occurrence in said container of a liquid level different from said predetermined level.

28. In a liquid level maintaining device, a reservoir having an inlet for liquid, liquid level responsive means controlling said inlet to maintain a substantially constant liquid level in said reservoir, means operable by said responsive means and cooperable therewith to stop further admission of liquid to said reservoir upon predetermined increase of liquid level above said constant level, said responsive means acting upon its liquid level increase stopping operation to quickly lower the liquid level in said reservoir.

29. In a control devce, a liquid receiving chamber, controlling means, lever means comprising a plurality of relatively movable arms, means exerting a force to hold said arms against relative movement and for movement in unison, means movable upon variation of liquid level in said chamber and operable on one of said arms to move said lever means, said movable means upon resistance to movement of another of said arms being operable to overcome said holding means and to move said one arm relative to said other arm, and means operable by said one arm upon its movement relative to said other arm to actuate said controlling means.

ANDREW KIP FOULDS.